United States Patent Office 3,392,135
Patented July 9, 1968

3,392,135
HEAT STABLE PLASTICIZED VINYL
HALIDE RESINS
Fred F. Holub, Scotia, and Moyer M. Safford, Schenectady, N.Y., assignors to General Electric Company, a corporation of New York
No Drawing. Filed June 24, 1965, Ser. No. 466,843
18 Claims. (Cl. 260—31.6)

ABSTRACT OF THE DISCLOSURE

A composition of matter comprising (a) a vinyl halide resin, (b) a specific saturated polyester plasticizer having a molecular weight of 500 to 5000, (c) a minor amount of a compound selected from the class consisting of triallyl trimesate, triallyl cyanurate, triallyl isocyanurate, trimethylol propane triacrylate, triallyl phosphate and acetyl triallyl citrate, and (d) a small amount of an organic peroxide.

This invention relates to heat-stable plasticized vinyl resins. More particularly, the invention is concerned with heat-curable vinyl halide resins comprising on a weight basis (a) 100 parts of a vinyl halide resin, (b) from 10 to 100 parts of a polyester plasticizer composed essentially of units of the formula I 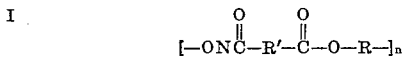

(c) from 1 to 25 parts of a trifunctional olefinic compound selected from the class consisting of triallyl trimesate, triallyl cyanurate, triallyl isocyanurate, trimethylol propane triacrylate, triallyl phosphate, and acetyl triallyl citrate, and (d) from 0.1 to 5 parts of an organic peroxide, where R is a divalent aliphatic radical of from 2 to 6 carbon atoms and R' is a member selected from the class consisting of (A) divalent aliphatic hydrocarbon radicals of from 3 to 12 carbons and (B) mixtures of (A) and phenylene

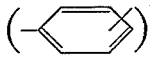

radicals, where the phenylene radicals comprise less than half (e.g., from 2 to 10%) the number of aliphatic radicals where R' is a mixture of both aliphatic and phenylene radicals, and n is a whole number from 2 to 15, the said plasticizer having a molecular weight of from 500 to 5000 and being liquid at temperatures of at least about 75° C., and preferably being liquid at room temperature. The invention also relates to heat-cured products and processes for making these heat-cured compositions.

Vinyl halide resins, for example, polyvinyl chloride, are used extensively as insulation for electrical conductors either directly on the conductor or as an outer covering for already insulated conductors. Many applications for conductors insulated with vinyl halide resins are satisfied by the use of the thermoplastic polymer. However, there are a number of applications where resistance to elevated temperatures is a requirement which the thermoplastic vinyl halide resin cannot satisfy. This is due to the fact that vinyl halide resins, particularly in the plasticized state, begin to soften and deform, usually in the range of 80–125° C., thereby exposing the conductor to the danger of short-circuits.

Many attempts have been made to effect cure or cross-linking of vinyl halide resins. One of these methods involves the use of metal salts such as described in Brous Patent U.S. 2,157,997. However, although such methods of crosslinking do improve the heat resistance of the vinyl halide resin and reduce or eliminate the fusibility and solubility of the polymer, nevertheless caution must be exercised in using these metal salts where stringent electrical properties are a requirement for the insulation. An additional problem which has arisen in the use of these metal salts is the inability to use the more commonly employed plasticizers for the polyvinyl halide resins. Thus, it has been found that the type of plasticizer used has a profound effect on the ability of the metal salt to effect crosslinking or curing of the vinyl halide resin.

To obviate the necessity of using the aforementioned metal salts, suggestions have been made that polyfunctional polymerizable coreactants be employed with the vinyl halide resin and that the ingredients be crosslinked or cured by means of organic peroxides. Thus, U.S. Patent 2,155,591 issued Apr. 25, 1939, U.S. 3,125,546 issued Mar. 17, 1964, and U.S. 3,141,850 issued July 21, 1964 disclose the crosslinking of vinyl halide resins using polyfunctional unsaturated coreactants with an organic peroxide. Although the fusion point of the vinyl halide resin is improved by this method and in many instances, the cured polymer will not even soften at temperatures as high as 150–200° C., nevertheless, complications have arisen from two sources. Many of the usually employed plasticizers have again been found to interfere with the cure of the resinous material so that the desired level of cure often is not obtained. In addition, when such cured polymers are subjected to continued heating at temperatures in the neighborhood of 125–150° C., conditions which insulated conductors may have to withstand for long periods of time, there are usually excessive losses in weight resulting in embrittlement of the polymer. This cannot be primarily accounted for by the loss of plasticizer since it has been found that this loss in weight accompanies plasticized cured vinyl halide resin compositions in which plasticizers are employed whose boiling points are well above the temperature at which the cured polymer is heat-aged.

Unexpectedly, we have discovered that a certain combination of a vinyl halide resin and a specific class of trifunctional unsaturated monomers can be converted to the substantially infusible and insoluble state by organic peroxides to give products which are extremely heat-resistant and show remarkably small weight losses, even after heat-aging for many hours at temperatures of 125–150° C. Despite such heat-aging, the flexibility of the insulated conductor is little if any affected by this treatment. We have found that these unexpected results are attained by using a particular class of coreactant trifunctional olefinic monomers with a special class of polymeric plasticizers corresponding to Formula I. We have also unexpectedly discovered that further improvement is possible in some cases by employing a certain group of stabilizers for the vinyl halide polymer without adversely affecting the other desirable properties attained by heat-treating the primary mixture of ingredients.

The linear polyester plasticizers employed in the practice of the present invention are generally obtained by reacting a mixture of ingredients comprising (1) a saturated aliphatic dihydric alcohol containing from 3 to 6 carbon atoms and (2) a saturated aliphatic dicarboxylic acid of from 3 to 12 carbon atoms. In preparing the polyester, generally one employs on a molar basis, one mole of the dicarboxylic acid per mole of the dihydric alcohol. If one desires that the polymer composed of the units of Formula I have terminal groups derived from residues of the dihydric alcohol, one can employ a slight molar excess up to 0.5 mole of the dihydric alcohol. If one wishes to have terminal groups of the polymer composed of units of Formula I derived from the dicarboxylic acid, one employs again a molar excess up to 0.5 mole of the dicarboxylic acid. This latter differentiation of end groups is important when one decides to effect chain stopping of the linear polyester to control molecular weight and to stabilize the polyester. If the terminal groups of the recurring unit of Formula I are derived from the dihydric alcohol, one can then employ monocarboxylic acids as chain stopping elements. Specific examples of such chain stopping saturated monocarboxylic acids are, for instance, acetic acid, butyric acid, hexanoic acid, 2-ethyl hexanoic acid, lauric acid, myristic acid, stearic, palimitic acids, etc.; vegetable oil acids, animal oil acids, rosin acids, etc. Longer chain monocarboxylic acids tend to improve the compatibility of the plasticizer with the vinyl halide resin.

If one employs as the chain stopping compound an alcohol for reaction with the units of Formula I wherein the end groups are derived from the dicarboxylic acid, one can use alcohols such as ethanol, butanol, 2-ethylhexanol, etc.

Among the dihydric alcohols which may be employed in making the polyester plasticizer are, for instance, propylene glycol, butylene glycol, propanediol-1,3, dipropylene glycol, neopentyl glycol, etc. Examples of aliphatic dicarboxylic acids which can be employed containing from 3 to 12 carbon atoms, include, for instance, adipic acid, sebacic acid, azelaic acid, pimelic acid, etc. The incorporation of aromatic, i.e., various phthalic acids (or acyl halides) to further modify the polyester in an amount equal to from 1 to 25% of the total weight of the aliphatic dicarboxylic acid or acids employed is not precluded. Among such aromatic acids which may be used are, for instance, orthophthalic acid, terephthalic acid, isophthalic acid, etc.

In preparing the plasticizers herein employed, and taking as an example the preparation of a butylene glycol adipate polyester, 1.2 moles 1,3-butanediol, 1.5 moles adipic acid and 1.2 moles 2-ethylhexanol are charged to a reaction vessel, preferably equipped with stirring and heating means, and a fractionating column equipped with a Dean Stark trap and condenser. The mixture dissolved in 100 ml. xylene is heated advantageously in an inert atmosphere at temperatures ranging from about 155–170° C. for from 2 to 15 hours until an acid number of less than 0.5 is obtained while at the same time removing the water of esterification formed during the process, as well as any excess 2-ethylhexanol. Usual esterification catalysts, such as sodium acetate, $Sn(C_4H_9)_4$ stannous oxalate, etc., can be employed. If desired, the reaction may be conducted in the presence of other selected solvents which are inert to the reactants or the reaction product. The reaction is carried out for a time and at a temperature necessary to give the desired molecular weight and with a concurrent decrease in the acid number indicating complete esterification.

The proportions of ingredients used to make the polyester can be varied widely depending on the molecular weight desired for the polyester employed as the plasticizer. Thus, on a molar basis there may be employed for each mole of the dicarboxylic acid from 0.7 to 1.3 moles or more of the dihydric alcohol with about 1.5 moles of the chain stopping monohydric alcohol or monocarboxylic acid. The conversion to the desired polyester state is carried out to a point where the acid value of the final reaction product is well below 5 for example, from 0.1 to 2. Other polymeric plasticizers coming within the scope of Formula I and methods for preparing the same are more particularly described in Belgian Patent 653,457 and in U.S. Patent 2,838,428, issued June 10, 1958 and assigned to the same assignee as the present invention.

The vinyl halide resins employed in the practice of this invention comprise the product of polymerization of a mass containing a vinyl halide, especially a predominant proportion of the vinyl halide. Among such compositions are (1) the polyvinyl halides, such as, for example, polyvinyl chloride, polyvinyl bromide, etc.; (2) vinyl resins produced by the conjoint polymerization of a vinyl halide, e.g., vinyl chloride, and a vinyl ester of a lower saturated aliphatic monocarboxylic acid, for instance, vinyl acetate (such as vinyl chloride-vinyl acetate copolymers being available under the trade name of Vinylite resins wherein the vinyl chloride component is present in a preponderant amount, i.e. greater than 50 weight percent), vinyl propionate, vinyl butyrate, vinyl hexoate, vinyl acetobutyrate, vinyl chloropropionate, etc., it being understood from the foregoing examples that the term "lower saturated aliphatic monocarboxylic acid" embraces ones containing at most six carbon atoms; (3) vinyl resins produced by the conjoint polymerization of a vinyl halide and an acrylic compound, e.g., the copolymers of vinyl chloride with, for example, ethyl methacrylate, methyl methacrylate, benzyl or chlorobenzyl acrylate, methyl chloroacrylate, etc.; (4) copolymers of a vinyl halide, e.g., vinyl chloride, and a vinylidene halide, e.g., vinylidene chloride; and (5) many other vinyl resin copolymers, such as the copolymers of three-component systems, for example, vinyl chloride, vinyl acetate and ethyl methacrylate, etc. As will be understood by those skilled in the art, other multicomponent copolymers may be used, the only requirement being that at least one of the components is a vinyl halide. Further methods of preparation of the vinyl halide resins employed herein and additional examples of vinyl halide copolymers which may be plasticized with the aforementioned chain-stopped linear polyesters may be found in e.g., D'Alelio Patents 2,378,753, issued June 19, 1945, and 2,299,740, issued Oct. 27, 1942, both of which are assigned to the same assignee as the present invention.

In order that those skilled in the art may better understand how the present invention may be practiced, the following examples are given by way of illustration and not by way of limitation. All parts are by weight, unless otherwise noted.

In the following examples, the polyester plasticizer A is a liquid polyester obtained by reacting adipic acid with neopentyl glycol (2,2-dimethyl-1,3-propanediol) until an acid No. 0.5–2.0 is obtained and a molecular weight within the range of 1100–1400 is attained. This material is liquid at 75° C. and has a refractive index $n_D^{20}$ 1.4656. Such plasticizers are manufactured by Eastman Chemical Products Co. of Kingsport, Tenn.

Polyester plasticizer B is a low acid liquid polyester derived from the coreaction of o-phthalic acid, azelaic acid, adipic acid, and propylene glycol and has a molecular weight of about 1670. Such polyesters are manufactured by Emery Industries, Cincinnati, Ohio.

Polyester plasticizer C is a liquid plasticizer obtained by coreacting adipic acid and 1,3-butanediol. This material has a molecular weight of 1560 and is liquid at room temperature (25–30° C.). Such polyesters are manufactured by Reinhold Chemicals, Inc., White Plains, N.Y.

Example 1

In this example, the following basic formulation was milled together for about 10 minutes on heated differential rolls until a homogeneous mixture of materials was obtained.

TABLE I

| Ingredients: | Parts |
| --- | --- |
| Polyvinyl chloride | 100 |
| Triallyl cyanurate | 14 |
| Tribase E stabilizer [1] | 10 |
| Di-α-cumyl peroxide | 1 |
| Polyester plasticizer | 55 |

[1] Basic lead silicate sulfate having a Pb content equivalent to 69% PbO and is sold by National Lead Co.

In each instance, each composition was heated for 30 minutes at 160° C. in a flat mold which was maintained at a pressure of about 1000 p.s.i. to give a flat sheet. Thereafter, the tensile strength of each cured composition was determined at 125° C. In addition, a sample of each cured sheet was heated for 72 hours at 136° C. to determine the amount of elongation retained (based on elongation before heat-aging) after this heat treatment, and also the percent weight loss after heating for this length of time. The following Table II shows the results of these tests for the three polyester plasticizers described above, and for comparison test results are also shown for other plasticizers normally used for plasticizing polyvinyl chloride.

TABLE II

| Plasticizer | Tensile Strength in p.s.i. at 125° C. | Percent Retention of Elongation After 72 hrs./ 136° C. | Percent Weight Loss After 72 hrs./ 136° C. |
|---|---|---|---|
| Polyester plasticizer A | 534 | 91 | 1.5 |
| Polyester plasticizer C | 536 | 87 | 1.5 |
| Polyester plasticizer B | 521 | | 1.5 |
| Tricresyl phosphate | 222 | 26 | 15 |
| Di-(2-ethylhexyl) phthalate | 353 | 11 | 24 |
| Di-(2-ethylhexyl) adipate | 287 | 10 | 27 |
| Di-(2-ethylhexyl) sebacate | 210 | 9 | 23 |

It will be noted from the above Table II that the first three polyester plasticizers coming within the scope of general Formula I exhibited markedly better tensile strengths at 125° C., and showed much lower weight losses and much greater retentions of elongation after heat aging for 72 hours at 136° C., than did the compositions using the other plasticizers. It should be noted that the boiling points of the ester plasticizers which exhibited the poorer values mentioned above all have boiling points well in excess of 136° C. at which the tests for elongation retention and weight loss were conducted.

Example 2

This example illustrates the effect of using another polyfunctional coreactant specifically triallyl trimesate in place of the triallyl cyanurate of Example 1 with the three polymeric plasticizers. In addition, this example illustrates the effect of using various heat stabilizers in the formulation. These stabilizers were found to be unexpectedly superior over many other usually employed stabilizers in imparting to heat-cured products improved tensile strength at elevated temperatures. In preparing the formulations described below, the mixtures of ingredients were milled at 135° C. and thereafter cured in the form of flat sheets at 160° C. for 30 minutes employing a gauge pressure of 1000 p.s.i. to give a sheet about 30–40 mils thick. The following Table III shows the formulations employed as well as the properties of the compositions tested. In the formulation portion of Table III, all values are in parts, by weight. The Tri-Mal stabilizer used is tribasic lead maleate monohydrate manufactured by National Lead Company and has the formula

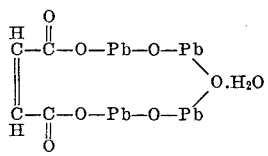

The dibasic lead phthalate stabilizer is also manufactured by National Lead Company and has the formula

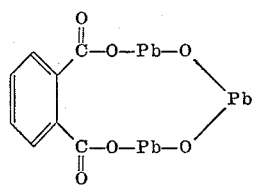

The Tribase E stabilizer is described in Example 1.

TABLE III

| | Sample | | |
|---|---|---|---|
| | A | B | C |
| Ingredient: | | | |
| Polyvinyl chloride | 100 | 100 | 100 |
| Polyester Plasticizer A | 55 | | |
| Polyester Plasticizer C | | 55 | |
| Polyester Plasticizer B | | | 55 |
| Triallyl trimesate | 14 | 14 | 14 |
| Di-(α-cumyl)peroxide | 1 | 1 | 1 |
| Tri-Mal | 10 | | |
| Tribase E | | 10 | |
| Dibasic Lead Phthalate | | | 10 |
| Properties: | | | |
| Tensile (p.s.i.) at room temperature | 3,760 | 3,663 | 3,833 |
| Elongation (percent) at room temperature | 177 | 173 | 157 |
| Tensile (p.s.i.) at 125° C. | 538 | 511 | 532 |
| Elongation (percent) at 125° C. | 228 | 203 | 196 |
| After 72 hours at 136° C. | | | |
| Tensile (p.s.i.) at room temperature | 3,766 | 3,887 | 3,930 |
| Elongation (percent) at room temperature | 151 | 151 | 128 |
| Percent Weight loss after 72 hours | 1.67 | 1.61 | 1.27 |
| Percent retention elongation after 72 hours | 85 | 87 | 81 |

Example 3

In this example formulations were prepared from polyvinyl chloride, triallyl cyanurate and the three polymeric polyester plasticizers used in the previous examples employing the same lead stabilizers. However, the amount of triallyl cyanurate employed was 7 parts per 100 parts polyvinyl chloride which was half of what was used in the preceding examples. Also the effect of using 1 part or 0.5 part of di-(α-cumyl) peroxide per 100 parts polyvinyl chloride with such a formulation was also evaluated. The following Table IV shows the ingredients and proportions of ingredients used together with the properties of the heat-cured materials, which were heated at the same temperatures and pressures and for the same length of time as in Example 1. Table IV also shows the results after more severe tests for some of the heat-cured products, namely, the percent elongation at 125° C. and a tensile strength at 125° C. was determined after heat aging the samples for seven days at 136° C.

TABLE IV

| | Sample Number | | | | | |
|---|---|---|---|---|---|---|
| | 1 | 2 | 3 | 4 | 5 | 6 |
| Ingredients: | | | | | | |
| Polyvinyl chloride | 100 | 100 | 100 | 100 | 100 | 100 |
| Triallyl cyanurate | 7 | 7 | 7 | 7 | 7 | 7 |
| Polyester Plasticizer A | 55 | 55 | | | | |
| Polyester Plasticizer C | | | 55 | 55 | | |
| Polyester Plasticizer B | | | | | 55 | 55 |
| Tri-Mal | 10 | 10 | | | | |
| Tribase E | | | 10 | 10 | | |
| Dibasic Pb Phthalate | | | | | 10 | 10 |
| Di-(α-cumyl) peroxide | 1.0 | 0.5 | 1.0 | 0.5 | 1.0 | 0.5 |
| Properties: | | | | | | |
| Tensile strength at 125° C., p.s.i. | 475 | 456 | 462 | 423 | 420 | 336 |
| Percent Elongation at 125° C. | 245 | 250 | 247 | 237 | 247 | 233 |
| Percent Wt. Loss at 136° C. for 72 hrs | 1.5 | 1.5 | 1.7 | 1.8 | 1.2 | 2.5 |
| Percent Elongation retention after 136° C. heating | 109 | 101 | 92.5 | 86.5 | 102 | 98 |
| Tensile strength p.s.i. at 125° C. after heat-aging 7 days at 136° C. | 454 | | 612 [1] | 527 | 664 [1] | 480 |
| Percent Elongation at 125° C. after heat-aging 7 days at 136° C. | 192 | | 215 [1] | 268 | 198 [1] | 215 |

[1] These tests were conducted on cured formulations which contained 3.5 parts triallyl cyanurate, and 1 part di-(α-cumyl) peroxide.

Example 4

When the polyfunctional coreactants triallyl isocyanurate, trimethylol propane triacrylate, triallyl phosphate and acetyl triallyl citrate are each substituted in the formulation of Example 1 for the triallyl cyanurate, and each formulation heat-treated and tested similarly as in Example 1, cured compositions are obtained whose physical properties at elevated temperatures are equally outstanding as the properties of the compositions shown in Example 1 using the polyester plasticizers. In addition, it is found that the aging of the heat-cured compositions with the polymeric plasticizers results in products whose retention of elongation is high and whose weight loss is exceptionally low.

In addition to the di-(α-cumyl) peroxide [or bis(α,α-dimethylbenzyl) peroxide as it is also known], one can employ other organic peroxides which desirably have decomposition point in excess of 100° C. A class of peroxides which are especially effective in causing the desired crosslinking and attainment of a cured product of improved properties are certain di(aralkyl) peroxides of the formula

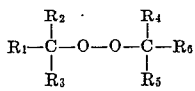

where $R_1$ is aralkyl, $R_2$, $R_3$, $R_4$, and $R_5$ are hydrogen or alkyl groups with less than 4 carbon atoms, and R is aralkyl. $R_2$, $R_3$, $R_4$, and $R_5$ may all be the same or each may be a different group or any two or more may be the same or different. Similarly, $R_1$ and $R_6$ may be the same or different aralkyl groups. Among such peroxides may be mentioned, for instance, dibenzyl peroxide, bis(α-methylbenzyl) peroxide, bis-(α-ethylbenzyl) peroxide, bis (α-propylbenzyl) peroxide, bis(α,α-dimethyl-p-isopropylbenzyl) peroxide, bis(α,α-dimethyl-p-methylbenzyl) peroxide, etc. Additional examples of the groupings which $R_1$, $R_2$, $R_3$, $R_4$ and $R_5$ may represent and examples of other peroxides within the scope of the above peroxide formula may be found disclosed in U.S. Patent 2,826,570, issued Mar. 11, 1958, which patent by reference is made part of the disclosures of the instant application. The amount of peroxide used may range from 0.1 to 5%, or more, by weight, based on the weight of the vinyl halide resin.

It will of course be apparent to those skilled in the art that other vinyl halide resins as well as other liquid linear polymeric plasticizers, many examples of which have been given above may be employed in place of the vinyl halide resin and polymeric plasticizers used in the foregoing working examples, without departing from the scope of the invention. Additional examples of liquid linear polyesters which may be employed are, for example, the product of reaction of adipic acid, dipropylene glycol and cocoanut oil fatty acids; the reaction product of propylene glycol, adipic acid and talloil; the reaction product of propylene glycol, adipic acid and lauric acid, etc.

The amount of polyester plasticizer used in each case can be varied at will and within wide limits, and no intent is to be read into any particular range being limiting, since the properties of plasticized vinyl halide resins are dependent to a large extent on the amount of plasticizer incorporated. Advantageously, on a weight basis, one can use from 10 to 70%, and preferably from 25 to 60% of the polyester plasticizer, based on the total weight of the vinyl halide resin and the plasticizer.

The amount of polyfunctional coreactants which may be employed can also be varied widely. Amounts as low as 1 to 5% of the coreactant based on the weight of the vinyl halide resin exert a significant effect on the final properties of the heat-cured product. Generally, we prefer to employ from about 3 to 25%, by weight, of the polyfunctional coreactant, based on the weight of the vinyl halide resin.

If a stabilizer is employed with the mixture of ingredients prior to heat conversion, it is preferably present in an amount equal from about 0.5 to 10 or 15%, by weight, baesd on the weight of the vinyl halide resin. Although amounts in excess of 15% may be employed, for economical reasons smaller amounts are preferred.

In the compounding of the plastic compositions, for various uses, there may be included, various fillers, such as titanium dioxide, lithopone, etc., as well as small amounts of other common plasticizers, preferably not to exceed 10 weight percent of the weight of the polyester plasticizer employed. Among such plasticizers may be mentioned, for instance, dioctyl phthalate, tricresyl phosphate, etc. Pigments and other modifying materials which do not have a detrimental effect upon the heat, light and electrical stability of the heat-cured plasticized compositions may also be incorporated. Heat-curing of the compositions can be varied widely. Thus, the temperature may vary from 125 to 250° C. for times of the order of 1 minute to several hours or more. Molding pressures of from 5 pounds to 5000 pounds or more may be used. Other molding means in addition to compression molding, such as extrusion, injection, etc. molding, may also be employed.

The claimed plasticized heat-cured composition can be used in various applications particularly where resistance to elevated temperatures is a requirement. In addition to insulating electrical conductors, for instance, copper conductors, aluminum conductors, alloys of copper and aluminum, etc. one can also insulate bus bars. These compositions can be used for encapsulating purposes by molding the mixture of ingredients around various electrical apparatus which requires resistance to heat. The ability to withstand elevated temperatures for long periods of time with relatively little if any change in the flexibility characteristics of the heat exposed product renders these compositions valuable for packaging purposes or for use of the material as heat shield compositions.

What we claim as new and desire to secure by Letters Patent of the United States is:

1. A composition of matter comprising on a weight basis (a) 100 parts of a vinyl halide resin, (b) from 10 to 100 parts of a saturated polyester plasticizer composed essentially of units of the formula

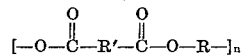

(c) from 1 to 25 parts of an olefinic compound selected from the class consisting of triallyl trimesate, triallyl cyanurate, trimethylol propane triacrylate, triallyl isocyanurate, triallyl phosphate and acetyl triallyl citrate, (d) from 0.1 to 15 parts of a stabilizer selected from the class consisting of tribasic lead maleate, dibasic lead phthalate, and basic lead silicate sulfate having a Pb content equivalent to 69% PbO, and (e) from 0.1 to 5 parts of an organic peroxide decomposing above 100° C., where R is a divalent saturated alkylene linear hydrocarbon radical of from 2 to 6 carbon atoms, and R' is a member selected from the class consisting of (A) saturated divalent aliphatic linear hydrocarbon radicals of from 3 to 12 carbons and (B) mixtures of (A) and phenylene radicals, where the phenylene radicals comprise less than half the number of aliphatic radicals when R' is a mixture of aliphatic and phenylene radicals and $n$ is a whole number from 2 to 15, the said plasticizer having a molecular weight of from 500 to 5000.

2. The heat-cured product of claim 1.

3. A composition of matter comprising on a weight basis (a) 100 parts polyvinyl chloride, (b) from 10 to 100 parts of a saturated polyester which is a reaction product of neopentyl glycol and adipic acid, said polyester having an acid number of 0.5–2.0 and a molecular weight of 1100–1400, (c) from 1 to 25 parts triallyl cyanurate, (d) from 0.1 to 15 parts of basic lead silicate sulfate having a Pb content equivalent to 69% PbO and (e) from 0.1 to 5 parts di-(α-cumyl) peroxide.

4. The heat-cured product of claim 3.

5. A composition of matter comprising on a weight basis (a) 100 parts of polyvinyl chloride, (b) from 10 to 100 parts of a saturated polyester plasticizer which is the reaction product of a mixture of o-phthalic acid, azelaic acid, adipic acid and propylene glycol having a molecular weight of about 1670, (c) from 1 to 25 parts triallyl cyanurate, (d) from 0.1 to 15 parts of basic lead silicate sulfate having a Pb content equivalent to 69% PbO and (e) from 0.1 to 5 parts of di-(α-cumyl) peroxide.

6. The heat-cured product of claim 5.

7. A composition of matter comprising on a weight basis (a) 100 parts of polyvinyl chloride (b) from 10 to 100 parts of a saturated polyester plasticizer which is a liquid reaction product of adipic acid and 1,3-butanediol having a molecular weight of 1560, (c) from 1 to 25 parts of triallyl cyanurate (d) from 0.1 to 15 parts of basic lead silicate sulfate having a Pb content equivalent to 69% PbO and (e) from 0.1 to 5 parts of di-($\alpha$-cumyl) peroxide.

8. The heat-cured product of claim 7.

9. A composition of matter comprising on a weight basis (a) 100 parts polyvinyl chloride, (b) from 10 to 100 parts of a saturated polyester which is a reaction product of neopentyl glycol and adipic acid, said polyester having an acid number of 0.5–2.0 and a molecular weight of 1100–1400, (c) from 1 to 25 parts triallyl trimesate, (d) from 0.1 to 15 parts of tribasic lead maleate monohydrate and (e) from 0.1 to 5 parts di-($\alpha$-cumyl) peroxide.

10. The heat-cured product of claim 9.

11. A composition of matter comprising on a weight basis (a) 100 parts of polyvinyl chloride, (b) from 10 to 100 parts of a saturated polyester plasticizer which is the reaction product of a mixture of o-phthalic acid, azelaic acid, adipic acid and propylene glycol having a molecular weight of about 1670, (c) from 1 to 25 parts triallyl trimesate, (d) from 0.1 to 15 parts of basic lead silicate sulfate having a Pb content equivalent to 69% PbO and (e) from 0.1 to 5 parts di-($\alpha$-cumyl) peroxide.

12. The heat-cured product of claim 11.

13. A composition of matter comprising on a weight basis (a) 100 parts of polyvinyl chloride, (b) from 10 to 100 parts of a saturated polyester plasticizer which is a liquid reaction product of adipic acid and 1,3-butanediol having a molecular weight of 1560, (c) from 1 to 25 parts of triallyl trimesate, (d) from 0.1 to 15 parts of dibasic lead phthalate and (e) from 0.1 to 5 parts of di-($\alpha$-cumyl) peroxide.

14. The heat-cured product of claim 13.

15. A composition of matter comprising on a weight basis (a) 100 parts polyvinyl chloride, (b) from 10 to 100 parts of a saturated polyester which is a reaction product of neopentyl glycol and adipic acid, said polyester having an acid number of 0.5–2.0 and a molecular weight of 1100–1400, (c) from 1 to 25 parts triallyl cyanurate, (d) from 0.1 to 15 parts of tribasic lead maleate monohydrate and (e) from 0.1 to 5 parts di-($\alpha$-cumyl) peroxide.

16. The heat-cured product of claim 15.

17. A composition of matter comprising on a weight basis (a) 100 parts of polyvinyl chloride, (b) from 10 to 100 parts of a saturated polyester plasticizer which is the reaction product of a mixture of o-phthalic acid, azelaic acid, adipic acid and propylene glycol having a molecular weight of about 1670, (c) from 1 to 25 parts triallyl cyanurate, (d) from 0.1 to 15 parts of dibasic lead phthalate and (e) from 0.1 to 5 parts, di($\alpha$-cumyl) peroxide.

18. The heat-cured product of claim 17.

References Cited

UNITED STATES PATENTS

| | | | |
|---|---|---|---|
| 3,141,850 | 7/1964 | Lybeck | 260—31.6 |
| 3,125,546 | 3/1964 | Pinner | 260—31.6 |
| 2,838,428 | 6/1958 | Bohrer | 260—31.6 |
| 3,250,738 | 5/1966 | Issacs | 260—31.6 |
| 2,555,062 | 5/1951 | Small | 260—31.6 |
| 3,149,087 | 9/1964 | Anagnostopoulos. | |

OTHER REFERENCES

Koroly: Industrial & Eng. Chem., May 1953, pp. 1060–1063.

Mellan: Industrial Plasticizers, 1963, pp. 243–250.

JULIUS FROME, *Primary Examiner.*